United States Patent [19]

Hoffmann

[11] 4,419,241

[45] Dec. 6, 1983

[54] TUBULAR FILTER ELEMENT FOR THE FILTRATION OF FLUIDS

[75] Inventor: Jürgen Hoffmann, Diemarden, Fed. Rep. of Germany

[73] Assignee: Sartorius GmbH, Göttingen, Fed. Rep. of Germany

[21] Appl. No.: 396,113

[22] Filed: Jul. 7, 1982

[30] Foreign Application Priority Data

Jul. 18, 1981 [DE] Fed. Rep. of Germany ....... 3128546

[51] Int. Cl.³ ...................... B01D 27/06; B01D 29/06
[52] U.S. Cl. .................................. 210/493.5; 55/497; 55/521
[58] Field of Search ............ 264/DIG. 48; 210/493.1, 210/493.5; 55/521, 497

[56] References Cited

U.S. PATENT DOCUMENTS 4,184,966 1/1980 Pall ........................................ 55/521

Primary Examiner—Frank Sever
Attorney, Agent, or Firm—Eric P. Schellin

[57] ABSTRACT

There is disclosed tubular filter element for the filtration of fluids, which is equipped with an enclosing housing with an inlet and outlet or is insertable into such a housing. The filter element is cylindrical and consists of a plurality of pleated radially extending folds. The filter is built up in several layers and the junction is bridged through at least one flexible connecting blank of synthetic material engaging between two layers and durably connected tight against leakage cohesively or adhesively by two seams or connecting zones. The flexible connecting blank by having a section extending between longitudinal edge portions of junction form an open fold pointing radially outwardly and a fold web pointing radially inwardly of the filter element.

12 Claims, 10 Drawing Figures

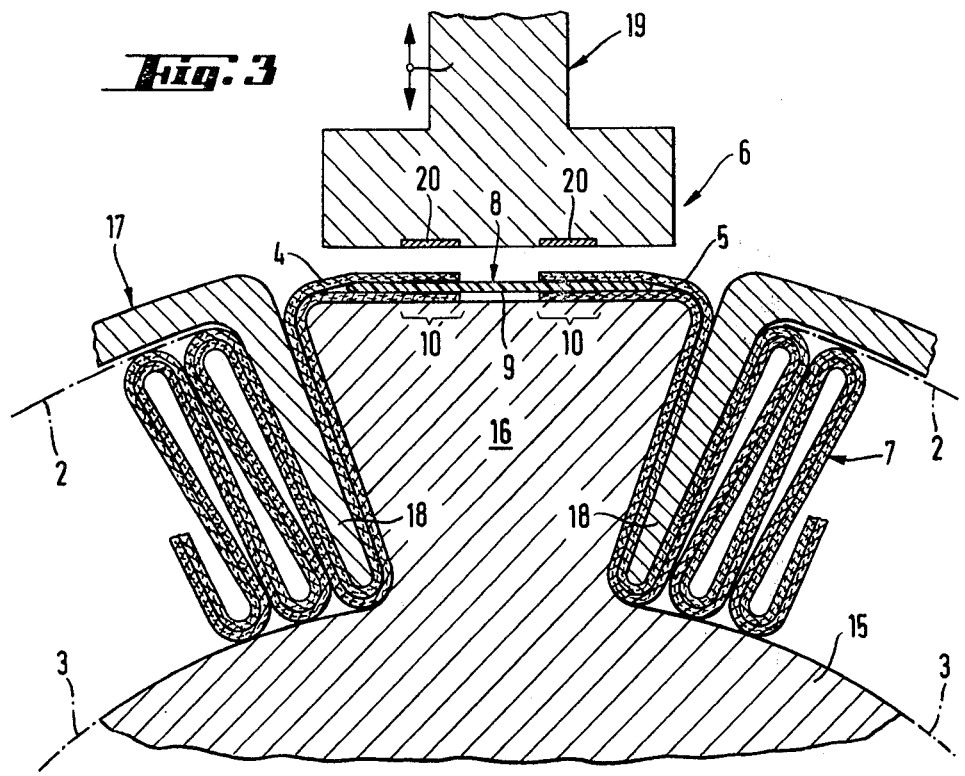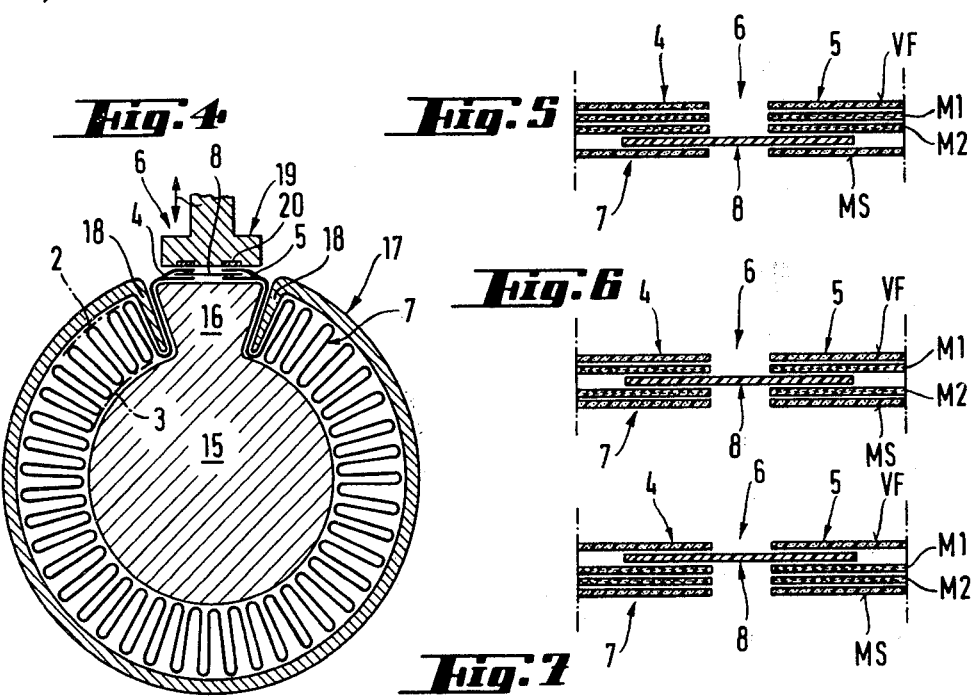

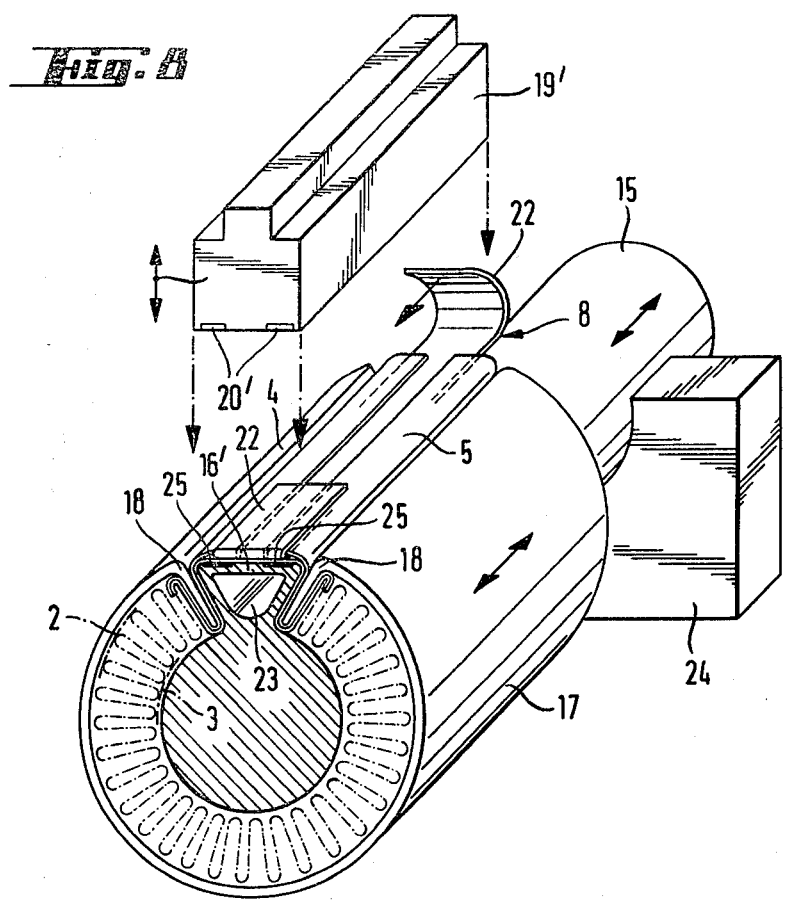
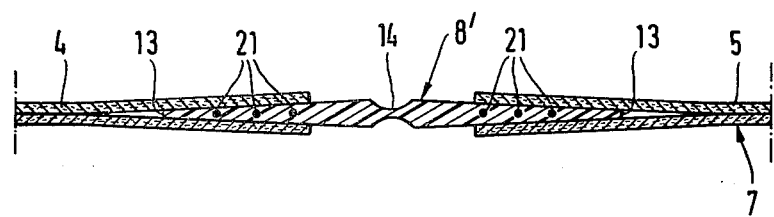
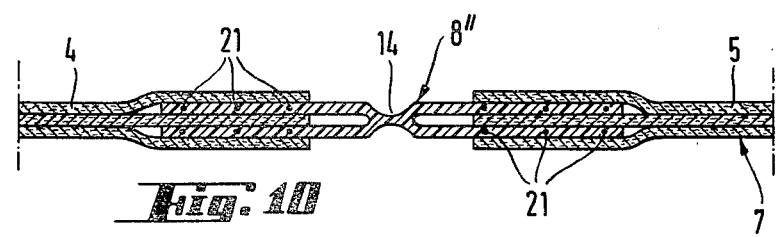

TUBULAR FILTER ELEMENT FOR THE FILTRATION OF FLUIDS

BACKGROUND OF THE INVENTION

The invention concerns a tubular filter element for the filtration of fluids, which is arranged in an enclosing housing supplied with at least one inlet and outlet for a to-be filtered fluid wherein the fluid flow is generally inward radially. Caps are provided at both ends to avoid leakage with the housing outlet in such a manner that the fluid path takes place only through the filter medium. The filter element is formed of a flat filter blank consisting of several layers, which is pleated into a plurality of essentially radially extending folds and the folded blank is shaped into a tubular unit in such a manner that the fold webs and fold openings extend in a direction of the inner and outer tube geometry. In the present inventive modification the end folds of the filter bank for the formation of the end fold portion of each end is a web and is directed radially to an inner shell and are connected tight against leakage one with the other, i.e. the end fold portions are connected.

Tubular filter elements are used to filter liquids which may be in the form of suspensions, dispersions, emulsions, colloidial solutions or gases in industry or in laboratory. Such filters have generally gained popularity because of their compact mode of construction and at the same time provide a large filter surface. Since it must be made certain that the fluid path takes place only through the actual filter medium, apart from the sealing at the end caps, the connectable end fold of both the end portions of the flat filter blank forms one of the critical points.

In a known filter element of the initially named mode of construction (GB-PS No. 750 396), the flat filter blank consists of a porous filter support, a layer of filter material of paper and a further filter support. The abutting or near abutting surfaces of the end fold portions are separated one from the other by a radially aligned filter strip and the webs of the end folds portions which are kept separate one from the other, are enclosed by an encompassing clamp of filter material, which is U-shaped in cross-section, is directed in the direction of an inner collecting shell and which is connected tight against leakage through adhesion with the end webs of the flat filter blank. It is also known to connect a filter element, which is constructed in several layers and in which the end webs are directed radially towards the inner collecting shell and somewhat shortened relative to the inner collecting shell, tight against leakage with a thermoplastic synthetic material. In that prior art case, the synthetic material is introduced into a gutter-like end fold so that the longitudinal edges of the webs and the ends, mutually facing and pointing to the inner shell, of the neighbouring folds are connected by thermoplastic or thermosetting synthetic material. This presupposes on the one hand that the space between the end folds is sufficiently large in order to introduce the adhesive substance; on the other hand, the end folds must not splay apart, since clamping must otherwise be employed. This construction has the disadvantage that the high liquid pressure that may be employed lies fully on such synthetic material adhesive bead which holds the filter material together at three sides in an end seam. This manner of end seam connection entails chemical and thermo-physical restrictions and is not suitable for all filter materials. A similar state of the art is known (DE-AS No. 24 17 551, U.S. Pat. No. 3,867,294), where a construction of the end fold is supplied with a synthetic resin bead which terminates with an outer shell and holds together the longitudinal edges, pointing in the direction of the outer shell, of the filter webs and its neighbouring folds. Also in this case, the entire liquid pressure lies on this glued seam. Such a glued seam, be it through gluing or through a thermoplastic synthetic material bead or welding, frequently leads to leakage, since the flat filter blank laid into folds is subject during the filtration operation to movements by reason of pressure differences or by reason of thermal stressing (multiple substance system, thermophysical effects). This applies also in view of the fact that filter elements of that kind are repeatedly subjected to a heat treatment in autoclaves. The thermo-mechanical stressings act radially as well as also in a circumferential direction of the tubular filter element.

It is also already known (U.S. Pat. No. 3,570,675) to connect the fold webs, pointing to an outer shell, of the end folds in the end region or also over the entire length by an adhesive substance arranged therebetween. Such a connection is usual particularly in the case of single layer filter material. Through the U.S. Pat. No. 4,184,966, it is also known in a multi-layer flat filter blank to let the webs end radially in direction of an outer shell and to connect both the webs by means of a rigid strip, having a U-shape in cross-section, of thermpolastic synthetic material in such a manner that the legs of the U-shaped thermoplastic strip each engage two layers of the mutually facing webs and are thermoplastically welded together with them. The web of the U-shaped blank in that case points in the direction of the outer shell of the filter element. Apart from the difficulties in the manipulation (stresses in the pleating cylinder, risk of injury of the membrane, more difficult introduction of the U-shaped strip), this seam formation also has the disadvantage that the entire fluid pressure lies perpendicularly from the outer shell on the longitudinal edges of the webs of the end folds so that the risk exists in such a case that these or individual layers detach from the thermoplastic strip and unifiltered medium thereby migrates to the filtrate side. A further disadvantage of such a seam formation is to be seen in that all layers of the flat filter blank must be thermoplastically activatable or thermally loadable in order that a connection one among the other and with the U-shaped thermoplastic strip is possible. Furthermore, it is disadvantageous that the end fold as seen from the inner shell does not have the same freedom of movement as the neighboring folds. The construction of the end fold according to the U.S. Pat. No. 4,184,966 is not always possible without removing the end webs of non-thermoplastic materials.

SUMMARY OF THE INVENTION

The present invention is therefore based on the achievement in the construction of the end seam of filter elements to avoid the defects described with respect to the state of the art or so to structure the end seam that on the one hand the end fold, which receives the actual connection, thermally and mechanically behaves no other than the remaining folds and the mechanical strength of the end fold is not exposed to higher loadings than the remaining folds. The end fold shall for the remainder also afford the possibility, in the case of a flat filter blank constructed in as many layers as desired, to use the most diverse materials as well as to connect any desired layers of the flat filter blank one with the other without the folding shape of the end seam having to be modified due to this.

This problem is solved according to the invention whereby both of the webs of the end fold portions are bridged over and durably connected separately with each of both the end webs cohesively or adhesively secured and are tight against leakage. This is accomplished by having at least one flexible connecting blank of synthetic material engaging between two layers of the multi-layer flat filter blank. The flexible connecting blank by its section extending between the longitudinal edges of the webs forms an open fold pointing radially outwardly and a fold web portion pointing radially inwardly wherein the mutually facing surfaces of the webs of the end fold are separated.

The filter element built up in several layers is formed, for example, in step wise fashion from the outer shell to the inner shell, out of a preliminary filter layer, a first and a second membrane layer and a membrane support and a flexible connecting blank is embedded between the second membrane layer and the membrane support and connected tightly against leakage with the membrane. In such a build-up, the flexible connecting blank can also be embedded between the first and second membrane layer, wherein at least a leakage tight seal is formed with the less porous membrane, or between the preliminary filter layer and the first membrane layer (thermoplastic membrane). In order to re-enforce the end faces of the tubular filter element in the region of the end folding and their embedding in the end caps or in the synthetic material of the housing, the flexible connecting blank can be dimensioned to be longer than the length of the tubular filter element, and its ends at the end face are than pushed in as end face foldings between two layers, not bridged over by the connecting blank, of the flat filter blank and its ends are connected with these or, however, its ends are folded over onto the outer or inner layer of the flat filter blank and connected therewith. The flat filter blank built up in several layers is supplied with incremental reduction in size from the outer shell to the inner shell. The connecting blank may act as a filter itself. The connections of the connecting means with both the webs of the filter can take place through all connecting techniques suitable for these materials.

BRIEF DESCRIPTION OF THE DRAWINGS

FIG. 3 is a cross-section through the device for the formation of the end folds in schematic illustration and in fragmentary form, FIG. 4 is a schematic illustration of a cross-section through the device according to FIG. 3, FIG. 5 is a cross-section schematically through the end fold during its production in a first embodiment, FIG. 6 is a further modification in corresponding illustration, FIG. 7 likewise is a further embodiment of the end fold arrangement, FIG. 8 is a perspective illustration, partially in cross-section through a modified device for the production of the end folds of the tubular filter element, FIG. 9 is a cross-section through a further embodiment of a connecting means and FIG. 10 is a further modification of a connecting means in cross-section and the embedding thereof in individual layers of a flat filter blank.

DETAILED DESCRIPTION

Figure 1:
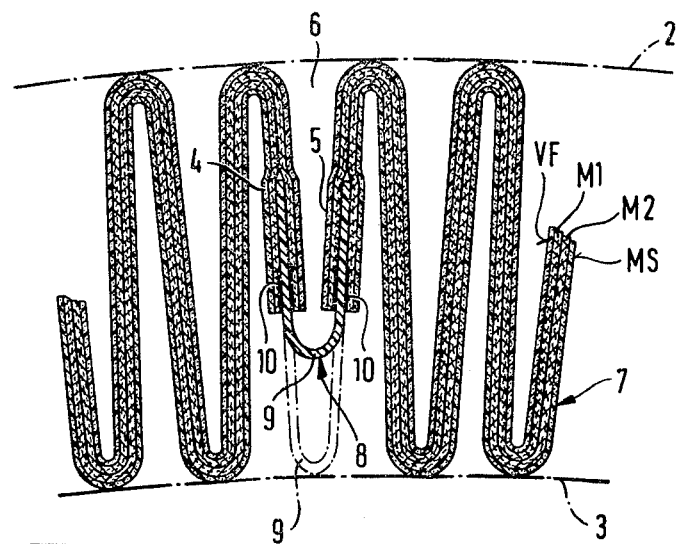
FIG. 1 is a cross-section through the pleated filter in the region of the connecting line, of interest, of the end fold with indicated outer shell and inner shell.
Figure 2:
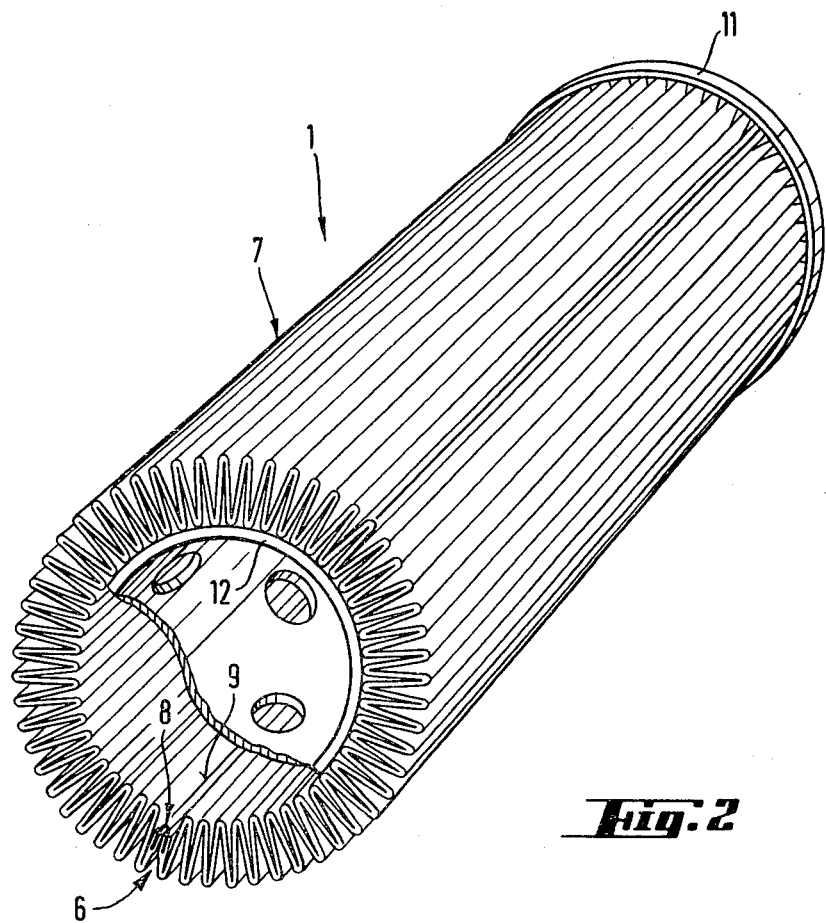
FIG. 2 is a perspective view of the filter with an already shaped-on end cap at one end with a portion broken away.

Attention is directed to FIG. 2, from which it can be seen that the finished filter element 1 usually consists of a multilayer pleated filter which is shaped into an elongated hollow cylinder. The end portions 4 and 5 of the webs are connected one with the other securely against leakage so that a hollow cylinder results which is closed in on itself in circumferential direction. The end faces of the thus hollow-cylindrically shaped flat filter blank 7 can each, as indicated in FIG. 2 at the rearward end face, receive an end cap 11 of synthetic plastic material, which for example closes off the thus formed hollow cylinder at one end of the manner of a lid, whilst the forward end face receives either an annular end cap open towards the inner shell 3 (see FIG. 1) or the end face is connected directly through gluing, welding or embedding with synthetic resin with a synthetic material housing which encloses the filter element 1 and is supplied with an inlet and an outlet.

It will be seen that the outer edge portions of the pleated completed cylindrical filter element 1 of the present invention describes an imaginary line denoted as an outer shell 2. Also concentrically, therewith is an imaginary line denoted as an inner shell 3 resulting from the inner edge portions of cylindrical filter element 1. Usually, the outer shell 2 (see FIG. 1) of the filter element 1 is connected with the inlet and the inner shell 3 with the outlet of the filter housing so that the fluid to be filtered, liquid or gas, can flow only in a path from the outer shell 2 through the filter medium in a direction towards the inner shell and the filtrate leaves the filter housing through the outlet. Arranged in the inner shell 3 is a supporting body 12, which is in the shape of a grid with large openings or a perforated hollow cylinder and which supports the hollow-cylindrically shaped pleated flat filter blank 7 against the fluid pressure. Equally, the outer shell 2 is enclosed by a similarly shaped, however not illustrated back pressure protection tubular means. This is the usual build-up of a tubular filter element according to the state of the art.

The flat filter blank 7 is constructed in several layers, in the example of the embodiment according to FIG. 1. It consists of one layer of preliminary filter VF, both the layers or membranes M1 and m2 with pore size diminishing towards the inner shell 3 and a layer of membrane support MS in the shape of a grid or fabric of monofilamentary synthetic material. The actual end fold 6 of the hollow-cylindrically shaped flat filter blank 7 is formed according to the invention by both the end portions 4 and 5 of the webs, which point radially inwardly towards the inner shell and can be constructed to be more or less shortened; maximally it can however also reach closely up to the inner shell 3. In this example of the embodiment, the connecting blank 8 is according to the invention pushed between both the membranes M1 and M2 of both the end portions of the webs so that the flexible connecting blank 8 of synthetic material bridges over the free space between both the end portions 4 and 5 and is permanently connected cohesively or adhesively by two seams tight against leakage with both the end portions 4 and 5. The width of the flexible connecting blank 8 is preferably so dimensioned that, by its section extending between the longitudinal edges of the end portions 4 and 5, it forms an open fold pointing to the outer shell and a fold web 9, which points to the inner shell and which rests on the support body 12, wherein the mutually facing surfaces of the end portions of the webs 4 and 5 are unconnected as for the remaining folds. The fluid penetrating into the individual folds, inclusive of the end fold 6, in that case presses in like manner as for all remaining folds on the folded web 9 of the connecting means 8 and has practically no possibility of attack for splaying open the longitudinal edges of the end portions 4 and 5 of the webs in the individual layers. The opposite is, for example, possible according to the state of the art, in which the web of the connecting blank, bent into U-shape in cross-section, lies on the outer shell and the fluid pressure thus endeavors to splay open the longitudinal edges of the end webs in circumferential direction.

In the embodiment according to the invention, the adhesive or cohesive connection of the connecting means 8 with the individual layers of the flat filter blank 7 is produced over wide laminated connecting zones 10, which provide an adequate tensile strength so that the fluid pressure bearing on the end fold 6 is not in a position of tearing the connecting blank 8 out of the webs 4 and 5 in direction of the inner shell 3.

The construction of the end fold 6 according to the invention has the advantage that this is in a position under the changing operational pressures of behaving like every other neighboring fold of the filter element 1 as well as is also in a position of absorbing the thermal stresses in the case of repeated autoclaving of the entire filter element 1. This applies also to the behavior of the entire hollow-cylindrically shaped flat filter blank 7 with respect to the end face end cap 11 or the synthetic material of the enclosing filter housing. Further advantages are to be seen in that a shortening of individual web layers is not necessary. Position, width and thickness of the material, position and width of the welding seam permit a diversity in the choice of parameters for optimum material matching.

According to the invention, the multi-layer flat fiber blank 7 is pleated into a plurality of folds and aligned hollow-cylindrically in a transient retaining tube 17, according to the schematic illustrations in FIGS. 3 to 8, wherein locating inwardly extending wings 18 are provided, which engage into the immediate neighboring folds of the end portions 4 and 5 of the webs.

A substantially cylindrically shaped supporting device 15 is used corresponding to the diameter of the inner shell 3. It has a supporting device 16, T-shaped or wedge-shaped in cross-section, holding both the webs 4 and 5 in a position extending approximately in circumferential direction of the outer shell 2. With the aid of further, not illustrated, splaying devices, the introduction of the connection means 8 takes place between two layers of the filter blank 7 of the two-layer construction indicated schematically in FIG. 3 or in the four-layer embodiment, illustrated in FIGS. 5 to 7, of the filter blank 7. With the aid of an activating die 19, which is movable radially and displays activating electrodes 20 according to the desired connecting zones 10, a durable connection of the individual layers of the filter blank 7 with the inserted connecting means 8 takes place through several layers, for example by ultrasonic welding. After the axial removal of the supporting devices 15 and 16 and of the transient retaining tube 17, by reason of the bias of the folded flat filter blank 7 and the endeavor thereof to expand in circumferential direction, a folding-in of the end portions of the webs 4 and 5 for the formation of an end fold 6 in the sense of the illustration according to FIG. 1 takes place automatically or is accomplished thermally or mechanically.

The length of the connecting means 8, the arrangement and width of the connecting zones 10 and the spacing of the longitudinal end portions 4 and 5, and their spacing from the inner shell depend substantially on the materials, to be connected, of the individual layers of the entire filter blank 7 and on the layer, in which the connecting means 8 is laminated with respect to the inner shell 3 or the outer shell 2. In the case of a plurality of layers, the webs are in a given case bevelled somewhat so that the length of the individual layers is shortened in increments towards the connecting means 8.

According to FIG. 5, the connecting means 8 is for example arranged between the second membrane M2 and the membrane support M5, while the connecting means 8 according to FIG. 6 is arranged between both the membranes M1 and M2; and according to FIG. 7 between the preliminary filter and the flat membrane M1. In a not illustrated modification, the connecting means 8 is laid in a diagonal fashion into the slots of the end portions 4 and 5 of the webs, for example, with respect to FIG. 7, on the lefthand side between the preliminary filter VF and the first membrane M1 and on the righthand side between the first membrane M1 and the second membrane M2. The actual connection of the connecting means 8 with the individual layers of the filter blank 7 takes place cohesively and/or adhesively in the widest sense, i.e. welding together of materials of related kind and/or materials of not related kind interengage by their surfaces through melting or dissolving of the one material or by interposition of thermally meltable or chemically dissolvable material of the connecting means 8, so that a durable connection of the individual layers with the connecting means 8 arises. This can take place, as mentioned in the above, through ultrasonic welding, thermal welding, high frequency welding or through laser welding. Equally, the connection through self-adhesive connecting strips, activatable for example only through pressure, is possible. Equally, these connecting strips can however also be activated thereby, that a solvent embedded in the connecting strip is released with the aid of pressure effect and softens the synthetic material of this connecting strip and lets it penetrate into the pores of the layers of the filter blank 7 to be connected.

According to FIGS. 9 and 10, it is also possible in the actual connecting means 8' and 8" to embed heater wires 21, which are heated electrically to thermally soften the synthetic material of the connecting means 8' and 8" in such a manner that under the effect of a pressure die in the manner of the activating die 19 penetrates into the pores of the layers of the webs 4 and 5 covering the edge regions of the connecting means 8' and 8".

According to FIG. 9, the connecting means 8' is constructed to be wedge-shaped in cross-section to both sides of a cross-sectional constriction 14 extending in direction of the central longitudinal axis so that the longitudinal edges 13 of the connecting means 8' splay both the layers of the end portions 4 and 5 of the webs in wedge shape. In this manner, thick edges are avoided at the transition areas. With relatively thick connecting means 8, the cross-sectional constriction 14 can facilitate the folding of the end portions 4 and 5 of the webs into the position shown in FIG. 1.

In the embodiment according to FIG. 10, a connecting means 8" has an X-shaped or H-shaped configuration in cross-section. Several layers of different filter materials are intimately connectible in the region of the end portions 4 and 5 of the web. The cross-sectional reduced constriction 14 can be part of a preshaped connecting means 8", which is X-shaped or H-shaped in cross-section. The connecting means 8" according to FIG. 10 has two flat connecting sections on each side of an elongated longitudinal central axis. These flat portions are inserted into the individual layers of the end portions 4 and 5 of the webs and are suitably connected thereto.

The apparatus according to FIG. 8 differs from that according to FIGS. 3 and 4 only through the cross-sectional formation of the anvil 16', which has a thermal welding means according to a conventional electronic pulse process. It is equipped with a coolant chamber 23 for the reception of a coolant and on its upper side is equipped with heater electrodes 25, which co-operate with the activating electrodes 20' of the activating die 19'. The supporting device 15, as is the embodiment according to FIGS. 3 and 4, is supported at both sides by counterbearings 24 during the contact pressure phase of the activating die 19 and 19', respectively. Through a radial movement away from the counterbearing 24 and through movements in direction of the longitudinal cylinder axis, the supporting device 15 as well as also the transient retaining tube 17 lets itself be moved into and out of the hollow-cylindrically preshaped flat filter blank 7. Equally, the supporting device 15 can be constructed to be stationary and the hollow-cylindrically shaped flat filter blank 7 is then mounted for movement.

FIG. 8 also shows an end face folding-over 22 of the ends of the connecting means 8. According to FIG. 8, the connection of connecting means 8 or 8' or 8" first takes place with the individual layers of the end portions 4 and 5 of the webs. Subsequently a folding-over 22 of the ends and repeated pressing-on of the folding 22, for example, to produce a thermal connection of this folded portion 22 with the outer layer of the webs 4 and 5. During the connection of the end faces of the hollow-cylindrically shaped flat filter blank 7 with the end caps 11 or the synthetic material of the synthetic material housing, an adequate strength of the same is assured in the region of the end fold 5.

In the utilization of the applicable filter materials, all commercially usual materials belonging to the state of the art can be operated upon, thus filter fleeces, microporous membranes and selectively permeable films, wherein the membrane support can be in the shape of a supporting fabric or supporting mesh or in the shape of a coarsely porous carrier material or also an integral component of the actual filter membrane. In the case of these membranes, there are as a rule thermoplastics, which may be welded, i.e. they are reversibly softenable or thermosetting substances are used, which are not weldable, i.e. they are not reversibly meltable or softenable. In the first case, there is employed the property of connecting blank 8 to a melting integration, while in the case of the use of thermosetting substances as a rule, there is concerned an intersticial engagement penetrating more or less deeply into the surface pores, of the molten synthetic substance of the connecting strip 8. Since for optimization of the filtration performance, the flat filter blank 7 built up in several layers can be formed of layers of thermosetting as well as also of thermoplastic material, the choices of material, thickness, bursting pressure, chemical behavior etc. and arrangement of the connecting blank 8 depends on between which layers an optimum connection is attainable. Some possibilities of variation as are indicated by way of example in FIGS. 5 to 7, are however not restricted thereto, since the principle of folding is possible also with further additional layers. For the remainder, in the case of a plurality of layers, several connecting blanks 8, 8' and 8" can also be pushed in between the individual layers of the webs 4 and 5.

The advantage of the construction of the end fold according to the invention in such tubular filter elements 1 is to be seen in the universal applicability for the most diverse filter materials and in that the end fold as weakest member of the entire folding can be matched through the arrangement of the connecting blank, through the choice in thickness of the material of the connecting blank to the strength conditions and the thermal, chemical, physical and filtration-technique behavior of the remaining folds.

What is claimed is:

1. In a pleated cylindrical filter for the filtration of fluids wherein the filter is constructed from a flat filter blank material, the material has a plurality of layers, the flat filter blank is pleated and the pleated filter material is bent to form an elongated cylinder with the folds of the pleats extending longitudinally with respect to the axis of the cylinder, the cylinder has an elongated junction zone consisting of the opposite edge portions of the blank which extend inwardly and radially, the improvement comprising an elongated connecting means in said junction zone, the connecting means having oppositely located elongated edge portions affixed between layers of said opposite edge portions of the blank, the connecting means forming an elongated, generally, longitudinal V-shaped fold, the apex of the fold extends inwardly and radially in the general direction of the flow of fluids through the filter, and the edge portions form legs of the fold extending outwardly and radially into the blank.

2. The filter of claim 1 wherein the connecting means is constructed of a synthetic flexible polymeric material.

3. The filter of claim 2 wherein the synthetic flexible polymeric material is a thermoplastic.

4. The filter of claim 2 wherein the synthetic flexible polymeric material is a thermosetting resin.

5. The filter of claim 2 wherein the connecting means is affixed between the said layers of said opposite edge portions by the application of sufficient heat to bond the connecting means to the said edge portions.

6. The filter of claim 4 wherein the connecting means is adhesively secured to said opposite edge portions.

7. The filter of claim 1 wherein the layers of material with regard to the flow path for the fluid to be filtered has a preliminary filter layer as a first layer, the second layer is a first membrane, the third layer is a third membrane of smaller pore size than that of the first membrane and the final layer is a membrane support layer and the connecting means portions is affixed between the second membrane layer and the membrane support.

8. The filter of claim 1 wherein electric heater wire means are embedded in the connecting means in the region of the affixing area whereby the wires supply heat for formation of thermal welds.

9. The filter of either claim 1 or 8 wherein the connecting means includes bifurcations on each elongated side whereby one elongated edge is positioned between two layers and the other elongated edge is positioned between two layers.

10. The filter of any one of claims 1 to 7 wherein the connecting means has elongated edge portions of a wedge shape in cross-section in the direction of its longitudinal edges.

11. The filter of any one of claims 1 to 7 wherein the region of its longitudinal central axis has a cross-sectional constriction thereby facilitating the transition into the filter material.

12. The filter of any one of claims 1 to 11 wherein the connecting means is formed of a filter material and itself operates as filter.

* * * * *